United States Patent
Hwang et al.

(10) Patent No.: US 10,670,117 B2
(45) Date of Patent: Jun. 2, 2020

(54) POWER TRANSMISSION APPARATUS FOR VEHICLE

(71) Applicants: Hyundai Motor Company, Seoul (KR); Kia Motors Corporation, Seoul (KR)

(72) Inventors: Seong Wook Hwang, Gunpo-si (KR); Seongwook Ji, Gunpo-si (KR); Ki Tae Kim, Incheon (KR); Chon Ok Kim, Yongin-si (KR); Wonmin Cho, Hwaseong-si (KR); Hyun Sik Kwon, Seoul (KR); Ilhan Yoo, Hwasun-eup (KR); Juhyeon Park, Suwon-si (KR); Cheol Ho Jang, Busan (KR); Dongwoo Kim, Incheon (KR); Hye Jin Lim, Seoul (KR); Ki Been Lim, Yongin-si (KR); Ki Dong Kim, Anyang-si (KR); Woo Jin Chang, Suwon-si (KR); Woochurl Son, Seongnam-si (KR); Kijong Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/208,207

(22) Filed: Dec. 3, 2018

(65) Prior Publication Data
US 2020/0063835 A1 Feb. 27, 2020

(30) Foreign Application Priority Data
Aug. 22, 2018 (KR) .................. 10-2018-0098114

(51) Int. Cl.
*F16H 3/78* (2006.01)
*F16H 3/72* (2006.01)
*B60K 6/365* (2007.10)

(52) U.S. Cl.
CPC ............... *F16H 3/724* (2013.01); *F16H 3/78* (2013.01); *B60K 6/365* (2013.01);
(Continued)

(58) Field of Classification Search
CPC ............. F16H 3/724; F16H 2200/0052; F16H 2200/2005; F16H 2200/2046; F16H 2200/0021; B60K 6/365
(Continued)

(56) References Cited

U.S. PATENT DOCUMENTS

| 7,575,529 B2 * | 8/2009 | Holmes ................. B60K 6/365 475/5 |
| 8,323,142 B2 | 12/2012 | Masumoto |

(Continued)

FOREIGN PATENT DOCUMENTS

EP 3 121 483 A1 1/2017

*Primary Examiner* — Roger L Pang
(74) *Attorney, Agent, or Firm* — Morgan, Lewis & Bockius LLP (57) ABSTRACT

A power transmission apparatus configured for a vehicle, may include a motor/generator including a motor shaft a first input shaft selectively connectable to the motor shaft, a second input shaft externally disposed with the first input shaft and selectively connectable to the motor shaft, a third input shaft externally disposed with the second input shaft and selectively connectable to the motor shaft, a first torque mediating shaft formed as a hollow shaft and coaxially and externally disposed with the first input shaft without rotational interference therebetween, an intermediate shaft parallel with the first input shaft, a first shifting section receiving a torque and outputting the shifted torque, and a second shifting section including a first planetary gear set selectively receiving the torques from the first shifting section and the third input shaft, respectively, and outputting shifted torque through one gear set.

17 Claims, 4 Drawing Sheets

(52) U.S. Cl.
CPC ............... *F16H 2200/0021* (2013.01); *F16H 2200/0052* (2013.01); *F16H 2200/2005* (2013.01); *F16H 2200/2007* (2013.01); *F16H 2200/2046* (2013.01); *F16H 2200/2051* (2013.01)

(58) Field of Classification Search
USPC ...................................................... 475/5, 218
See application file for complete search history.

(56) References Cited

U.S. PATENT DOCUMENTS

| | | | |
|---|---|---|---|
| 8,801,566 B2 * | 8/2014 | Phillips | ................... F16H 37/04 475/302 |
| 9,022,891 B2 * | 5/2015 | Phillips | ..................... F16H 3/78 475/218 |
| 10,081,240 B2 * | 9/2018 | Lee | ........................ B60K 6/543 |
| 2013/0031990 A1 | 2/2013 | Singh et al. | |
| 2015/0045173 A1 * | 2/2015 | Beck | ...................... B60K 17/08 475/275 |
| 2015/0087471 A1 * | 3/2015 | Beck | ......................... F16H 3/66 475/278 |
| 2018/0154757 A1 * | 6/2018 | Lee | ........................ B60K 6/365 |
| 2020/0047601 A1 * | 2/2020 | Park | ........................ B60K 6/547 |
| 2020/0047602 A1 * | 2/2020 | Chae | ........................ F16H 3/725 |
| 2020/0047603 A1 * | 2/2020 | Park | ........................ B60K 6/365 |
| 2020/0063829 A1 * | 2/2020 | Jang | ........................ F16H 3/724 |

\* cited by examiner

| | Shift-stage | ECL | CL1 | CL2 | CL3 | CL4 | B1 |
|---|---|---|---|---|---|---|---|
| Engine mode / Parallel mode | FD1 | ● | ● | | | ● | |
| | FD2 | ● | | ● | | ● | |
| | FD3 | ● | | | ● | ● | |
| | FD4 | ● | | ● | ● | | |
| | FD5 | ● | ● | | ● | | |
| | FD6 | ● | | | ● | | ● |
| EV mode | FD1 | | ● | | | ● | |
| | FD2 | | | ● | | ● | |
| | FD3 | | | | ● | ● | |
| | FD4 | | | ● | ● | | |
| | FD5 | | ● | | ● | | |
| | FD6 | | | | ● | | ● |

| | Shift-stage | ECL | CL1 | CL2 | CL3 | CL4 | B1 | SN1 | | | SN2 | | |
|---|---|---|---|---|---|---|---|---|---|---|---|---|---|
| | | | | | | | | H | N | IPG1 | IDG2 | N | IDG4 |
| Engine mode / Parallel mode | REV | ● | | ● | | ● | | ○ | ● | ○ | | | ● |
| | FD1 | ● | ● | | | ● | | ● | | | ○ | ● | ○ |
| | FD2 | ● | | ● | | ● | | ○ | ● | ○ | ● | | |
| | FD3 | ● | ● | | | ● | | | | ● | ○ | ● | ○ |
| | FD4 | ● | | | ● | ● | | ○ | ● | ○ | ○ | ● | ○ |
| | FD5 | ● | ● | | ● | | | | | ● | ○ | ● | ○ |
| | FD6 | ● | | ● | ● | | | ○ | ● | ○ | ● | | |
| | FD7 | ● | ● | | ● | | | ● | | | ○ | ● | ○ |
| | FD8 | ● | | | ● | | ● | ○ | ● | ○ | ○ | ● | ○ |
| | FD9 | ● | | ● | ● | | | ○ | ● | ○ | | | ● |
| EV mode | REV | | | ● | | ● | | ○ | ● | ○ | | | ● |
| | FD1 | | ● | | | ● | | ● | | | ○ | ● | ○ |
| | FD2 | | | ● | | ● | | ○ | ● | ○ | ● | | |
| | FD3 | | ● | | | ● | | | | ● | ○ | ● | ○ |
| | FD4 | | | | ● | ● | | ○ | ● | ○ | ○ | ● | ○ |
| | FD5 | | ● | | ● | | | | | ● | ○ | ● | ○ |
| | FD6 | | | ● | ● | | | ○ | ● | ○ | ● | | |
| | FD7 | | ● | | ● | | | ● | | | ○ | ● | ○ |
| | FD8 | | | | ● | | ● | ○ | ● | ○ | ○ | ● | ○ |
| | FD9 | | | ● | ● | | | ○ | ● | ○ | | | ● |

○ : Preliminary engagement available

POWER TRANSMISSION APPARATUS FOR VEHICLE

CROSS-REFERENCE TO RELATED APPLICATION

The present application claims priority to Korean Patent Application No. 10-2018-0098114 filed on Aug. 22, 2018, the entire contents of which is incorporated herein for all purposes by this reference.

BACKGROUND OF THE INVENTION

Field of the Invention

The present invention relates to a power transmission apparatus for a vehicle. More particularly, the present invention relates to a power transmission apparatus for a vehicle for realizing multiple shifting stages by adding at least one planetary gear set in a dual clutch transmission structure and achieving the vehicle to run in an electric vehicle mode and a parallel hybrid mode by adding one motor/generator.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such a future vehicle technology.

The DCT may include two clutch devices and a gear train of a manual transmission. The DCT selectively transmits torque input from an engine to two input shafts through two clutches, changes the torque selectively transmitted to the two input shafts through the gear train, and outputs the changed torque.

The DCT is used to realize a compact transmission achieving a forward speed higher than a fifth forward speed. The DCT is used as an automated manual transmission that does not require a driver's manual manipulation by controlling two clutches and synchronizers by a controller.

Compared with an automatic transmission with planetary gear sets, the DCT has excellent power delivery efficiency, simplifies change and addition of components for achieving multiple gear stages, and improves fuel economy.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus configured for a vehicle having advantages of realizing multiple shifting stages by adding at least one planetary gear set in a dual clutch transmission structure and achieving the vehicle to run in an engine driving mode, an electric vehicle mode and a parallel hybrid mode by adding one motor/generator, simplifying its internal structure by reducing the number of components, improving fuel economy by minimizing the weight, and improve the mountability by reducing the volume.

Various aspects of the present invention are directed to providing a power transmission apparatus configured for achieving more multiple shifting stages by adding a synchronizer.

A power transmission apparatus configured for a vehicle according to various exemplary embodiments of the present invention may include a motor/generator including a motor shaft selectively connectable to an engine output shaft of an engine, a first input shaft selectively connectable to the motor shaft, a second input shaft formed as a hollow shaft, coaxially and externally disposed with the first input shaft without rotational interference therebetween, and selectively connectable to the motor shaft, a third input shaft formed as a hollow shaft, coaxially and externally disposed with the second input shaft without rotational interference therebetween, and selectively connectable to the motor shaft, a first torque mediating shaft formed as a hollow shaft and coaxially and externally disposed with the first input shaft without rotational interference therebetween, an intermediate shaft disposed in parallel with the first input shaft, a first shifting section receiving a torque through a first input shaft, shifting the received torque through a plurality of gear sets, and outputting the shifted torque, and a second shifting section including a first planetary gear set including a first sun gear fixedly connected to the first torque mediating shaft, selectively receiving the torques from the first shifting section and the third input shaft, respectively, and outputting shifted torque through one gear set.

The first torque mediating shaft may be fixedly connected to the second input shaft. The first shifting section may include a first gear set including a first drive gear fixedly connected to the first input shaft, and a first driven gear fixedly connected to the intermediate shaft and externally gear-meshed with the first drive gear, and a second gear set including a second drive gear fixedly connected to the first torque mediating shaft and a second driven gear fixedly connected to the intermediate shaft and externally gear-meshed with the second drive gear.

A gear ratio of the first gear set may be used for the first forward speed and the fifth forward speed and a gear ratio of the second gear set may be used for the second forward speed.

The first planetary gear set may further include a first planet carrier fixedly connected to the third input shaft and a first ring gear externally gear-meshed with an output shaft through a third gear set.

The first planetary gear set may be a single pinion planetary gear set.

The third gear set may include a third drive gear fixedly connected to an external circumference of the first ring gear and a third driven gear fixedly connected to the output shaft and externally gear-meshed with the third drive gear.

A gear ratio of the third gear set may be used for the fourth forward speed.

The power transmission apparatus may further include five clutches each selectively connecting a corresponding pair of shafts and a brake selectively connecting a shaft to the transmission housing.

The five clutches may include an engine clutch disposed between the engine output shaft and the motor shaft, a first clutch disposed between the motor shaft and the first input shaft, a second clutch disposed between the motor shaft and the second input shaft, a third clutch disposed between the motor shaft and the third input shaft and a fourth clutch disposed between the intermediate shaft and the output shaft, and the brake may be disposed between the intermediate shaft and the transmission housing.

The first torque mediating shaft may be coaxially and externally disposed with the second input shaft without rotational interference therebetween. The first shifting section may further include a second torque mediating shaft formed as a hollow shaft and coaxially and externally disposed with the intermediate shaft without rotational interference therebetween, an idle shaft parallel with the intermediate shaft, a second planetary gear set including rotation elements, and two rotation elements of the rotation elements are connected to the intermediate shaft and the second torque mediating shaft, respectively, a first gear set including a first drive gear fixedly connected to the first input shaft, and a first driven gear fixedly connected to the intermediate shaft and externally gear-meshed with the first drive gear, a second gear set including a second drive gear, a second driven gear and an idle output gear, the second drive gear fixedly connected to the first torque mediating shaft, the second driven gear connected to the other rotation element of the second planetary gear and externally gear-meshed with the second drive gear, and the idle output gear fixedly connected to the idle shaft and externally gear-meshed with the second driven gear, a fourth gear set including a fourth drive gear externally disposed with the second input shaft without rotational interference and a fourth driven gear fixedly connected to the idle shaft and externally gear-meshed with the fourth drive gear, a first synchronizer configured for selectively connecting the first driven gear with the second torque mediating shaft and selectively connecting the second torque mediating shaft with transmission housing, and a second synchronizer configured for selectively connecting the second, fourth drive gears with the second input shaft.

The first planetary gear set may be a single pinion planetary gear set and the second planetary gear set may be a double pinion planetary gear set.

The second planetary gear set may include a second sun gear fixedly connected to the intermediate shaft, a second planet carrier fixedly connected to the second torque mediating shaft, and a second ring gear fixedly connected to the second driven gear of the second gear set. The first planetary gear set may further include a first planet carrier fixedly connected to the third input shaft, and a first ring gear externally gear-meshed with an output shaft through a third gear set.

The third gear set may include a third drive gear fixedly connected to an external circumference of the first ring gear, and a third driven gear fixedly connected to the output shaft and externally gear-meshed with the third drive gear.

The idle shaft may receive a torque of the second input shaft through the fourth gear set and transmit the received torque to the second driven gear.

A gear ratio of the first gear set may be used for the third forward speed and the fifth forward speed, a gear ratio of the second gear set may be used for the second forward speed, a gear ratio of the third gear set may be used for the sixth forward speed, and a gear ratio of the fourth gear set may be used for the ninth forward speed and the reverse speed.

The power transmission apparatus may further include five clutches each selectively connecting a corresponding pair of shafts, and a brake selectively connecting a shaft to the transmission housing.

The five clutches may include an engine clutch disposed between the engine output shaft and the motor shaft, a first clutch disposed between the motor shaft and the first input shaft, a second clutch disposed between the motor shaft and the second input shaft, a third clutch disposed between the motor shaft and the third input shaft and a fourth clutch disposed between the second driven gear and the output shaft, and the brake may be disposed between the intermediate shaft and the transmission housing.

A power transmission apparatus configured for a vehicle according to various exemplary embodiments may realize multiple shifting stages by adding at least one planetary gear set in a dual clutch transmission structure and achieving the vehicle to run in an engine driving mode, an electric vehicle mode and a parallel hybrid mode by adding one motor/generator, simplifying its internal structure by reducing the number of components, improving fuel economy by minimizing the weight, and improve the mountability by reducing the volume.

A power transmission apparatus configured for a vehicle according to various exemplary embodiments further employs two synchronizer and one planetary gear set, and enables the vehicle to run in an engine driving mode, an electric vehicle mode and a parallel hybrid mode.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Figure 1:
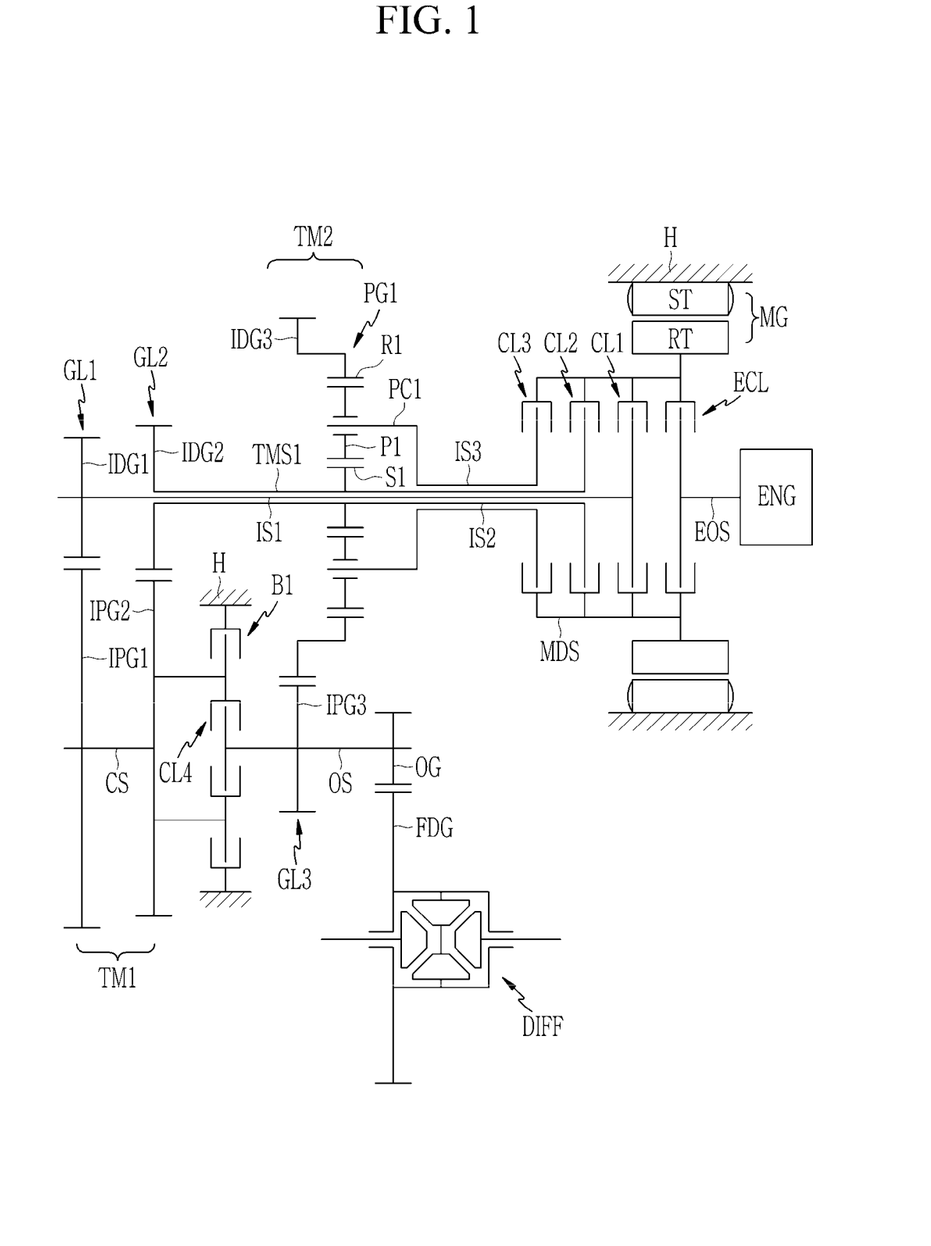
FIG. 1 is a schematic view of a power transmission apparatus configured for a vehicle according to various exemplary embodiments of the present invention.

FIG. 1 is a schematic view of a power transmission apparatus configured for a vehicle according to various exemplary embodiments of the present invention.

Referring to FIG. 1, a power transmission apparatus configured for a vehicle according to various exemplary embodiments of the present invention includes an engine ENG, a motor/generator MG, first, second, third input shafts IS1, IS2, and IS3, a first torque mediating shaft TMS1, an intermediate shaft CS, first, second shifting sections TM1 and TM2 and an output shaft OS.

The engine ENG is a primary power source and a variety of typical engines such as a gasoline engine or a diesel engine that utilizes fossil fuel may be used as the engine ENG.

The motor/generator MG as an auxiliary power source may act as a motor and also as a generator, and includes a stator ST and a rotor RT, where the stator ST is fixed to a transmission housing H and the rotor RT is rotatably supported within the stator ST.

Torques from the engine ENG and/or the motor/generator MG are shifted into a plurality of fixed shifting stages in the first shifting section TM1 and the torque from the first shifting section TM1 and a torque from separated routes from the engine are shifted into a plurality of shifting stages in the second shifting section TM2 and output through the output shaft OS.

The first, second, third input shaft IS1, IS2, and IS3 and the first torque mediating shaft TMS1 are coaxially disposed and the intermediate shaft CS and the output shaft OS are parallel with the first, second, third input shaft IS1, IS2, and IS3 and the first torque mediating shaft TMS1, and are coaxially disposed.

The motor/generator MG is disposed to be rear of the engine ENG. A motor shaft MDS fixedly connected to the rotor RT of the motor/generator MG is selectively connectable to an output shaft EOS of the engine ENG interposing an engine clutch ECL.

The first input shaft IS1 is selectively connectable to the motor shaft MDS and the first input shaft IS1 delivers torques from the engine ENG and the motor/generator MG to the first shifting section TM1.

The second input shaft IS2 is formed as a hollow shaft and disposed coaxial with and external to the first input shaft IS1 without rotational interference therebetween, and selectively connectable to the motor shaft MDS thereby selectively transmitting torques of the engine ENG and the motor/generator MG to the second shifting section TM2.

The third input shaft IS3 is formed as a hollow shaft and disposed coaxial with and external to the second input shaft IS2 without rotational interference therebetween, and selectively connectable to the motor shaft MDS thereby transmitting the torques of the engine ENG and the motor/generator MG to second shifting section TM2.

The first torque mediating shaft TMS1 is formed as a hollow shaft and disposed coaxial with and external to the first input shaft IS1 and connected to the second input shaft IS2.

The first shifting section TM1 includes the intermediate shaft CS. The intermediate shaft CS is externally gear-meshed with the first input shaft IS1 through the first gear set GL1, and externally gear-meshed with the first torque mediating shaft TMS1 through the second gear set GL2.

The second shifting section TM2 includes a first planetary gear set PG1 and the first planetary gear set PG1 is a single pinion planetary gear set. The first planetary gear set PG1 includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1.

The first sun gear S1 is fixedly connected to the second input shaft IS2 and the first torque mediating shaft TMS1, the first planet carrier PC1 is fixedly connected to the third input shaft IS3, and the first ring gear R1 is externally gear-meshed with the output shaft OS through the third gear set GL3.

As a result, when the first sun gear S1 is fixed to the transmission housing H, the rotation speed of the first ring gear R1 becomes increased in comparison with the speed of the first planet carrier PC1 receiving a torque input from the first input shaft IS1. Thus, the first planetary gear set PG1 receiving a torque of the first input shaft IS1 through the first planet carrier PC1 forms a shifted intermediate torque with an increased rotation speed and outputs the shifted intermediate torque through the first ring gear R1. Furthermore, when torque inputs from the second and third input shafts IS2 and IS3 are transferred to the first sun gear S1 and the first planet carrier PC1 simultaneously, the first planetary gear set PG1 integrally rotates, thus the first planetary gear set PG1 outputs torque as inputted.

The first gear set GL1 includes a first drive gear IDG1 fixedly connected to first input shaft IS1, and a first driven gear IPG1 fixedly connected to the intermediate shaft CS and externally gear-meshed with the first drive gear IDG1.

The second gear set GL2 includes a second drive gear IDG2 fixedly connected to the first torque mediating shaft TMS1 and a second driven gear IPG2 fixedly connected to the intermediate shaft CS and externally gear-meshed with the second drive gear IDG2. The intermediate shaft CS is selectively connectable to the transmission housing H through the second driven gear IPG2 acting as a fixed element and is selectively connectable to the output shaft OS for power delivery.

The third gear set GL3 include a third drive gear IDG3 fixedly connected to an external circumference of the first ring gear R1 and a third driven gear IPG3 fixedly connected to the output shaft OS and externally gear-meshed with the third drive gear IDG3.

Gear ratios of the first, second, and third gear sets GL1, GL2, and GL3 may be set according to design factors such as engine and vehicle specifications. According to an exemplary embodiment of the present invention, a gear ratio of the first gear set GL1 is used for realizing the first forward speed and the fifth forward speed, a gear ratio of the second gear set GL2 is used for realizing the second forward speed and the sixth forward speed, and the third gear set GL3 is used for realizing the fourth forward speed.

The output shaft OS is an output element and selectively connectable to the intermediate shaft CS. and the output shaft OS receives torques input from the first shifting section TM1 through the intermediate shaft CS and from the second shifting section TM2 through the third gear set GL3 and transmits the received torque to a differential DIFF through the output gear OG and the final reduction gear FDG.

Furthermore, five engagement elements of an engine clutch ECL and first to fourth clutches CL1, CL2, CL3, and CL4 are disposed between rotation members such as various shafts, and one engagement element of brake B1 is disposed between a rotation member and the transmission housing H.

The engagement elements ECL, CL1, CL2, CL3, CL4 and B are disposed as follows.

The engine clutch ECL is disposed between the engine output shaft EOS (i.e., engine crankshaft) and the motor shaft MDS and selectively connects the engine output shaft EOS and the motor shaft MDS.

The first clutch CL1 is disposed between the motor shaft MDS and the first input shaft IS1 and selectively connects the motor shaft MDS and the first input shaft IS1.

The second clutch CL2 is disposed between the motor shaft MDS and the second input shaft IS2 and selectively connects the motor shaft MDS and the second input shaft IS2.

The third clutch CL3 is disposed between the motor shaft MDS and the third input shaft IS3 and selectively connects the motor shaft MDS and the third input shaft IS3.

The fourth clutch CL4 is disposed between the intermediate shaft CS and the output shaft OS and selectively connects the intermediate shaft CS and the output shaft OS.

The brake B1 is disposed between the intermediate shaft CS and the transmission housing H for the intermediate shaft CS to be acted as a fixed element.

The engagement elements of the engine clutch ECL, the first, second, third, and fourth clutches CL1, CL2, CL3 and CL4 and the brake B1 may be realized as multi-plate hydraulic pressure friction devices that are frictionally engaged by hydraulic pressure, however, it may not be understood to be limited thereto, since various other configuration that are electrically controllable may be available.

Figure 2:
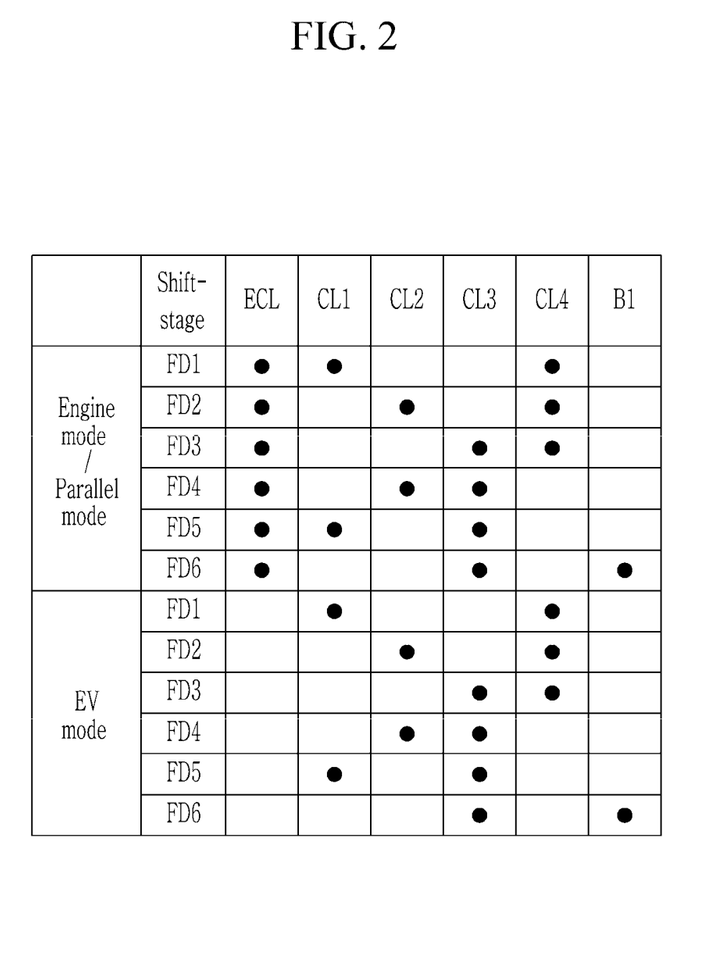
FIG. 2 is a shifting operation chart for a power transmission apparatus configured for a vehicle according to various exemplary embodiments of the present invention.

FIG. 2 is a shifting operation chart for a power transmission apparatus configured for a vehicle according to various exemplary embodiments of the present invention in FIG. 1, and the power transmission apparatus configured for a vehicle according to various exemplary embodiments in FIG. 1 performs shifting operation as follows.

[Engine and Parallel Mode First Forward Speed]

In the engine and parallel mode first forward speed FD1, as shown in FIG. 2, the engine clutch ECL and the first and fourth clutches CL1 and CL4 are operated.

As such, by the operations of the engine clutch ECL and the first clutch CL1, the torque of the engine ENG is input to the intermediate shaft CS through the motor shaft MDS, the first input shaft IS1 and the first gear set GL1, and the torque of the intermediate shaft CS is transferred to the differential DIFF through the output shaft OS by the operation of the fourth clutch CL4, realizing the first forward speed FD1.

The gear ratio of the first gear set GL1 is used for realizing the first forward speed FD1.

[Engine and Parallel Mode Second Forward Speed]

In the engine and parallel mode second forward speed FD2, the engine clutch ECL and the second and fourth clutches CL2 and CL4 are operated.

As such, by the operations of the engine clutch ECL and the second clutch CL2, the torque of the engine ENG is input to the intermediate shaft CS through the motor shaft MDS, the second input shaft IS2, the first torque mediating shaft TMS1, and the second gear set GL2, and the torque of the intermediate shaft CS is transferred to the differential DIFF through the output shaft OS by the operation of the fourth clutch CL4, realizing the second forward speed FD2.

The gear ratio of the second gear set GL2 is used for realizing the second forward speed FD2.

[Engine and Parallel Mode Third Forward Speed]

In the engine and parallel mode third forward speed FD3, the engine clutch ECL and the third and fourth clutches CL3 and CL4 are operated.

As such, by the operations of the engine clutch ECL and the third clutch CL3, the torque of the engine ENG is input to the first planet carrier PC1 through the motor shaft MDS and the third input shaft IS3.

In a state that the engine torque is transferred to the first planet carrier PC1, the third gear set GL3, the output shaft OS, the intermediate shaft CS, the second gear set GL2 and the first torque mediating shaft TMS1 are connected by the operation of the fourth clutch CL4 so that first sun gear S1 and first ring gear R1 are connected. and a shifted output torque by the cooperative operation of rotation members of the first planetary gear set PG1 is transferred to the differential DIFF through the output shaft, realizing the third forward speed FD3.

In the instant case, the rotation speed of the first sun gear S1 depends on the rotation speed of the second driven gear IPG2, and the rotation speed of the first ring gear R1 depends on the rotation speed of the third driven gear IPG3.

[Engine and Parallel Mode Fourth Forward Speed]

In the engine and parallel mode fourth forward speed FD4, the engine clutch ECL and the second and third clutches CL2 and CL3 are operated.

As such, by the operations of the engine clutch ECL and the second clutch CL2, partial torque of the engine ENG is input to the first sun gear S1 through the motor shaft MDS and the second input shaft IS2, and partial torque of the engine ENG is input to the first planet carrier PC1 through the third input shaft IS3 by the operation of the third clutch CL3.

Since the torque of the engine ENG is input to the first sun gear S1 and the first planet carrier PC1 simultaneously, the first planetary gear set PG1 integrally rotates so that the torque input to the first planetary gear set PG1 is output as inputted to the differential DIFF through the output shaft OS, realizing the fourth forward speed FD4.

[Engine and Parallel Mode Fifth Forward Speed]

In the engine and parallel mode fifth forward speed FD5, the engine clutch ECL and the first and third clutches CL1 and CL3 are operated.

As such, by the operations of the engine clutch ECL and the first clutch CL1, partial torque of the engine ENG is input to the first sun gear S1 through the first input shaft IS1, the first gear set GL1, the intermediate shaft CS, the second gear set GL2, and the first torque mediating shaft TMS1, and partial torque of the engine ENG is input to the first planet carrier PC1 through the third input shaft IS3 by the operation of the third clutch CL3.

As such, torques input through the first sun gear S1 and the first planet carrier PC1 are combined to form a shifted output torque of an increased or decreased rotation speed by the cooperative operation of rotation members of the first planetary gear set PG1, and the shifted output torque is transferred to the differential DIFF through the output shaft OS, realizing the fifth forward speed FD5.

In the fifth forward speed, since the torque according to the gear ratios of the first and second gear sets GL1 and GL2 is transferred to the first sun gear S1 and the torque according to the gear ratio of the third gear set GL3 is transferred to the first planet carrier PC1, such that increased rotation speed is realized.

[Engine and Parallel Mode Sixth Forward Speed]

In the engine and parallel mode sixth forward speed FD6, the engine clutch ECL, the third clutch CL3 and the brake B1 are operated.

As such, by the operations of the engine clutch ECL and the third clutch CL3, the torque of the engine ENG is input to the first planet carrier PC1 through the third input shaft IS3.

In a state that, the first sun gear S1 acts as a fixed element by the operation of the brake B1, the first planet carrier PC1 receives input torque. Thus rotation speed of the first ring gear R1 is increased and output to the differential DIFF through the output shaft OS, realizing the sixth forward speed FD6.

That is, in the sixth forward speed, since the first sun gear S1 acts as a fixed element, the shifted output torque increased in the rotation speed than in the fifth forward speed FD5.

In the above description of the "engine and parallel mode", only the engine ENG is exampled as a power source. However, it may be obviously understood that such shifting operation may be maintained even if the motor/generator MG is activated to form a parallel mode and assist the engine ENG.

An electric vehicle mode EV mode differs from the engine and parallel mode, only in that the engine ENG is stopped while releasing the engine clutch ECL and only the motor/generator MG is used as sole power source. It may be understood that such a difference will not affect the above-described shifting operation, and thus, in such an electric vehicle mode EV mode the same shifting stages of six forward speeds of the first forward speed FD1 to the sixth forward speed FD6 may be obtained by the same operational chart.

It may be understood that the reverse speed may be achieved by operating the motor/generator MG in a reverse direction in the electric vehicle mode EV.

A power transmission apparatus configured for a vehicle according to various exemplary embodiments realizes six shifting stages by employing one planetary gear set and one motor/generator to a multiple clutch transmission, facilitating multiple shifting stages by a simplified arrangement, improving installability, and reducing an overall weight.

Figure 3:
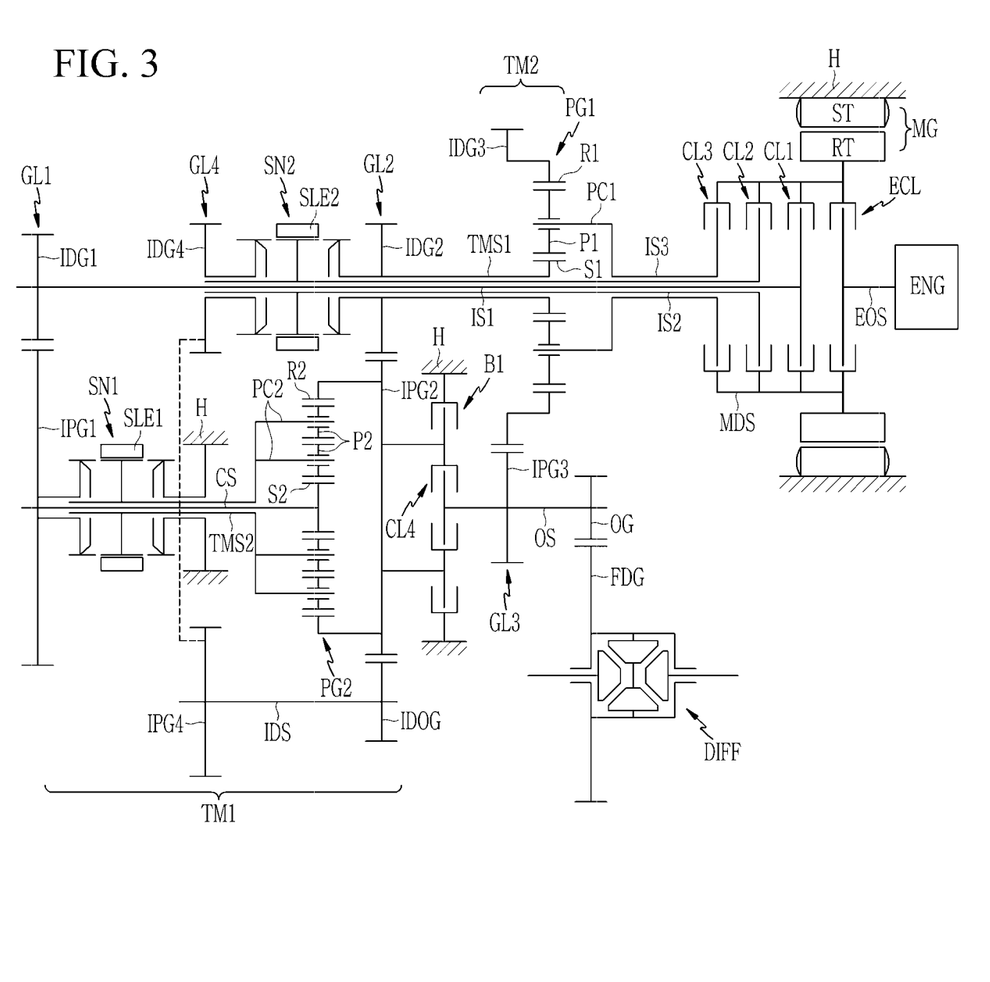
FIG. 3 is a schematic view of a power transmission apparatus configured for a vehicle according to various exemplary embodiments of the present invention.

FIG. 3 is a schematic view of a power transmission apparatus configured for a vehicle according to various exemplary embodiments of the present invention.

Referring to FIG. 3, various exemplary embodiments in comparison with the various exemplary embodiments in FIG. 1 further employs the first torque mediating shaft TMS1 is coaxially and externally disposed with the second input shaft IS2 as well as the first input shaft IS1 without rotational interference therebetween and the first shifting section TM1 may further include a second torque mediating shaft TMS2, an idle shaft IDS, a second planetary gear set PG2, a fourth gear set GL4 and two synchronizers SN1 and SN2, realizing the ninth forward speeds and one reverse speed.

The second torque mediating shaft TMS2 is formed as a hollow shaft and coaxially and externally disposed with the intermediate shaft CS without rotational interference therebetween.

An idle shaft IDS is parallel with the intermediate shaft CS. On the idle shaft IDS, a fourth driven gear IPG4 and an idle output gear IDG are fixed.

The second planetary gear set PG2 may include rotation elements, and two rotation elements of the rotation elements are connected to the intermediate shaft CS and the second torque mediating shaft TMS2 respectively.

The second planetary gear set PG2 is a double pinion planetary gear set, and may include a second sun gear S2, a second planet carrier PC2 rotatably supporting a plurality of second pinion gears P2 of which internally disposed pinion gears are externally gear-meshed with the second sun gear S2, and a second ring gear R2 internally gear-meshed with externally disposed pinion gears of the plurality of second pinion gears P2.

That is, the second sun gear S2 is fixedly connected to the intermediate shaft CS, the second planet carrier PC2 is fixedly connected to the second torque mediating shaft TMS2, and the second ring gear R2 is fixedly connected to the second driven gear IPG2 of the second gear set GL2.

The fourth gear set GL4 may include a fourth drive gear IDG4 externally disposed with the second input shaft IS2 without rotational interference and a fourth driven gear IPG4 fixedly connected to the idle shaft IDS and externally gear-meshed with the fourth drive gear IDG4.

The second gear set GL2 may further include the idle output gear IDOG externally gear-meshed with the second driven gear IPG2. and the second drive gear IDG2 is fixedly connected to the first sun gear S1 the first sun gear S1 through the first torque mediating shaft TMS1 coaxially and externally disposed with the second input shaft IS2.

Thus, the torque of the second input shaft IS2 is transmitted to the idle shaft IDS through the fourth gear set GL4 and output to the second driven gear IPG2 of the second gear set GL2 in reduced rotation speed.

The first synchronizer SN1 is disposed on the intermediate shaft CS and the second synchronizer SN2 is disposed on the second input shaft IS2.

The first synchronizer SN1 selectively connects the first driven gear IPG1 with the second torque mediating shaft TMS2 and selectively connects the second torque mediating shaft TMS2 with transmission housing H.

The second synchronizer SN2 selectively connects the second and fourth drive gears IDG2 and IDG4 with the second input shaft IS2.

In the various exemplary embodiments of the present invention, a gear ratio of the first gear set GL1 is used for the third forward speed and the fifth forward speed, a gear ratio of the second gear set GL2 is used for the second forward speed, a gear ratio of the third gear set GL2 is used for the sixth forward speed, and a gear ratio of the fourth gear set GL4 is used for the ninth forward speed and the reverse speed.

The first and second synchronizers SN1 and SN2 may be formed as a known scheme, and the first and second sleeves SLE1 and SLE2 applied to the first and second synchronizers SN1 and SN2 may be operated by respective actuators which may be controlled by a transmission control unit.

Figure 4:
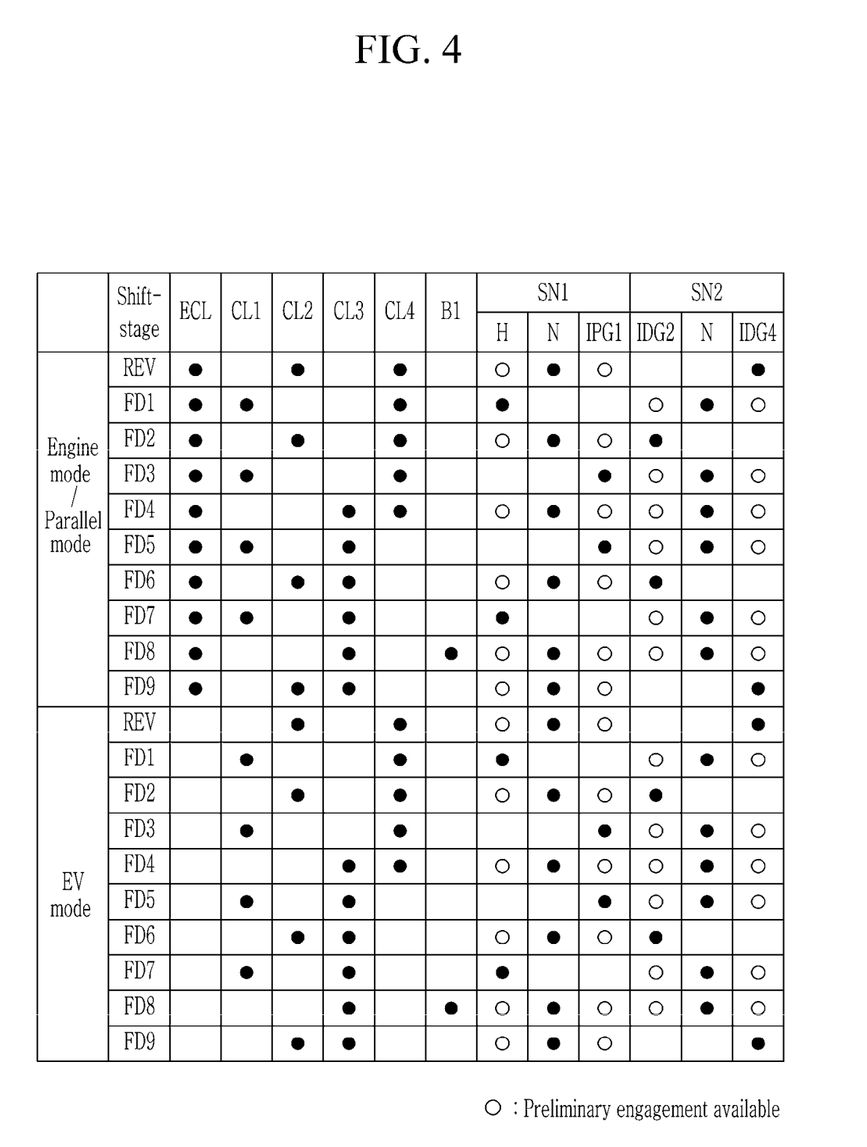
FIG. 4 is a shifting operation chart for a power transmission apparatus configured for a vehicle according to various exemplary embodiments of the present invention.

FIG. 4 is a shifting operation chart for a power transmission apparatus configured for a vehicle according to various exemplary embodiments of the present invention in FIG. 3, and the power transmission apparatus configured for a vehicle according to various exemplary embodiments in FIG. 3 performs shifting operation as follows.

[Engine and Parallel Mode Reverse Speed]

In the engine and parallel mode reverse speed REV, as shown in FIG. 4, the intermediate shaft CS and the fourth drive gear IDG4 are synchronously connected by the sleeve SLE2 of the second synchronizer SN2, and the engine clutch ECL and the second and fourth clutches CL2 and CL4 are operated.

As such, the torque of the engine ENG is input to the second driven gear IPG2 through the motor shaft MDS, the second input shaft IS2, the fourth gear set GL4, the idle shaft IDS, and the idle output gear IDOG by the operation of the second clutch CL2.

And the torque of the second driven gear IPG2 is transferred to the differential DIFF through the output shaft OS by the operation of the fourth clutch CL4, realizing the reverse speed.

[Engine and Parallel Mode First Forward Speed]

In the engine and parallel mode the first forward speed FD1, the second torque mediating shaft TMS2 and the transmission housing H are synchronously connect by the sleeve SLE1 of the synchronizer SN1, and the engine clutch ECL and the first and fourth clutches CL1 and CL4 are operated.

As such, the torque of the engine ENG is input to the second sun gear S2 through the motor shaft MDS, the first input shaft IS1, the first gear set GL1, and the intermediate shaft OS by the operations of the engine clutch ECL and the first clutch CL1. In the instant case, the second torque mediating shaft TMS2 is fixed by the operation of the first synchronizer SN1 so that the second planet carrier PC2 acts as a fixed element.

Thus, the torque input to the second sun gear S2 is shifted and transferred to the second driven gear IPG2 through the second ring gear R2 in reduced rotation speed, and the torque of the second driven gear IPG2 is transferred to the differential DIFF through the output shaft OS, realizing the first forward speed FD1.

That is, the rotation speed, which is shifted according to the gear ratio of the first gear set GL1, is further reduced in the first planetary gear set PG1.

[Engine and Parallel Mode Second Forward Speed]

In the engine and parallel mode second forward speed FD2, the second input shaft IS2 and the second drive gear IDG2 are synchronously connected by the sleeve SLE2 of the second synchronizer SN2, and the engine clutch ECL and the second and fourth clutches CL2 and CL4 are operated.

As such, the torque of the engine ENG is input to the second driven gear IPG2 through the motor shaft MDS, the second input shaft IS2, and the second gear set GL2 by the operations of the engine clutch ECL and the second clutch CL2.

And the torque of the second driven gear IPG2 is transferred to the differential DIFF through the output shaft OS by the operation of the fourth clutch CL4, realizing the second forward speed FD2.

That is, the second forward speed is realized by the gear ratio of the second gear set GL2.

[Engine and Parallel Mode Third Forward Speed]

In engine and parallel mode third forward speed FD3, the first driven gear IPG1 and the second torque mediating shaft TMS2 are synchronously connect by the sleeve SLE1 of the synchronizer SN1, and the engine clutch ECL and the first and fourth clutches CL1 and CL4 are operated.

As such, the torque of the engine ENG is input to the second sun gear S2 through the motor shaft MDS, the first input shaft IS1, the first gear set GL1, and the intermediate shaft OS by the operations of the engine clutch ECL and the first clutch CL1. In the instant case, the first driven gear IPG1 and the second torque mediating shaft TMS2 are by the operation of the first synchronizer SN1 and the input torque is transferred to the second sun gear S2 and the second planet carrier PC2 simultaneously, so that the second planetary gear set PG2 integrally rotates.

And the torques transferred to the second sun gear S2 and the second planet carrier PC2 simultaneously is transferred to the differential DIFF through the output shaft OS, realizing the third forward speed FD3.

That is, the third forward speed is realized by the gear ratio of the first gear set GL1.

[Engine and Parallel Mode Fourth Forward Speed]

In the engine and parallel mode fourth forward speed FD4, the first and second synchronizers SN1 and SN2 neutral, and the engine clutch ECL and the third and fourth clutches CL3 and CL4 are operated.

As such, by the operations of the engine clutch ECL and the third clutch CL3, the torque of the engine ENG is input to the first planet carrier PC1 through the motor shaft MDS and the third input shaft IS3.

In a state that the engine torque is transferred to the first planet carrier PC1, the third gear set GL3, the output shaft OS, the second gear set GL2 and the first torque mediating shaft TMS1 are connected by the operation of the fourth clutch CL4 so that first sun gear S1 and first ring gear R1 are connected. and a shifted output torque by the cooperative operation of rotation members of the first planetary gear set PG1 is transferred to the differential DIFF through the output shaft, realizing the fourth forward speed FD4.

In the instant case, the rotation speed of the first sun gear S1 depends on the rotation speed of the second driven gear IPG2, and the rotation speed of the first ring gear R1 depends on the rotation speed of the third driven gear IPG3.

[Engine and Parallel Mode Fifth Forward Speed]

In the engine and parallel mode fifth forward speed FD5, the first driven gear IPG1 and the second torque mediating shaft TMS2 are synchronously connect by the sleeve SLE1 of the synchronizer SN1, and the engine clutch ECL, the first and third clutches CL1 and CL3 are operated.

As such, partial torque of the engine ENG is input to the second sun gear S2 through the motor shaft MDS, the first input shaft IS1, the first gear set GL1, and the intermediate shaft OS by the operations of the engine clutch ECL and the first clutch CL1. In the instant case, the first driven gear IPG1 and the second torque mediating shaft TMS2 are by the operation of the first synchronizer SN1 and the input torque is transferred to the second sun gear S2 and the second planet carrier PC2 simultaneously, so that the second planetary gear set PG2 integrally rotates.

The torques transferred to the second sun gear S2 and the second planet carrier PC2 are transferred to the first sun gear S1 through the second gear set GL2 and partial torque of the engine ENG is input to the first planet carrier PC1 through the motor shaft MDS and the third input shaft IS3.

As such, torques input through the first sun gear S1 and the first planet carrier PC1 are combined to form a shifted output torque of an increased or decreased rotation speed by the cooperative operation of rotation members of the first planetary gear set PG1, and the shifted output torque is transferred to the differential DIFF through the output shaft OS, realizing the fifth forward speed FD5.

In the fifth forward speed, since the torque according to the gear ratios of the first and second gear sets GL1 and GL2 is transferred to the first sun gear S1 and the torque of the engine ENG is input to the first planet carrier PC1, such that the rotation speed is shifted.

[Engine and Parallel Mode Sixth Forward Speed]

In the engine and parallel mode second forward speed FD2, the second input shaft IS2 and the second drive gear IDG2 are synchronously connected by the sleeve SLE2 of the second synchronizer SN2, and the engine clutch ECL and the second and third clutches CL2 and CL3 are operated.

As such, partial torque of the engine ENG is input to the first sun gear S1 through the motor shaft MDS, the second input shaft IS2, the second synchronizer SN2, and the first torque mediating shaft TMS1, and partial torque of the engine ENG is input to the first planet carrier PC1 through the third input shaft IS3 by the operation of the third clutch CL3.

Since the torque of the engine ENG is input to the first sun gear S1 and the first planet carrier PC1 simultaneously, the first planetary gear set PG1 integrally rotates so that the torque input to the first planetary gear set PG1 is output as inputted to the differential DIFF through the output shaft OS, realizing the sixth forward speed FD6.

[Engine and Parallel Mode Seventh Forward Speed]

In the engine and parallel mode seventh forward speed FD7, the second torque mediating shaft TMS2 and the transmission housing H are synchronously connected by the sleeve SLE1 of the synchronizer SN1, and the engine clutch ECL and the first and third clutches CL1 and CL3 are operated.

As such, the torque of the engine ENG is input to the second sun gear S2 through the motor shaft MDS, the first input shaft IS1, the first gear set GL1, and the intermediate shaft OS by the operations of the engine clutch ECL and the first clutch CL1. In the instant case, the second torque mediating shaft TMS2 is fixed by the operation of the first synchronizer SN1 so that the second planet carrier PC2 acts as a fixed element.

Thus, the torque input to the second sun gear S2 is shifted and transferred to the second driven gear IPG2 through the second ring gear R2 in reduced rotation speed, and the torque of the second driven gear IPG2 is transferred to the first sun gear S1 through the second gear set GL2 and the first torque mediating shaft TMS1. and partial torque of the engine ENG is input to the first planet carrier PC1 through the third input shaft IS3 by the operation of the third clutch CL3.

As such, torques input through the first sun gear S1 and the first planet carrier PC1 are combined to form a shifted output torque of an increased or decreased rotation speed by the cooperative operation of rotation members of the first planetary gear set PG1, and the shifted output torque is transferred to the differential DIFF through the output shaft OS, realizing the seventh forward speed FD7.

In the fifth forward speed, since the torque according to the gear ratios of the first and second gear sets GL1 and GL2 is transferred to the first sun gear S1 and the torque of the engine ENG is input to the first planet carrier PC1, such that the rotation speed is shifted.

[Engine and Parallel Mode Eighth Forward Speed]

In the engine and parallel mode eighth forward speed FD8, the first and second synchronizers SN1 and SN2 are in neutral state, the engine clutch ECL, the third clutch CL3 and the brake B1 are operated.

As such, by the operations of the engine clutch ECL and the third clutch CL3, the torque of the engine ENG is input to the first planet carrier PC1 through the third input shaft IS3 and the first sun gear S1 acts as a fixed element by the operation of the brake B1.

Thus rotation speed of the first ring gear R1 is increased and output to the differential DIFF through the third gear set GL3 and the output shaft OS, realizing the eighth forward speed FD8.

That is, since in the first planetary gear set PG1 the first sun gear S1 acts as a fixed element and the first planet carrier PC1 receives torque, the shifted output torque increased in the rotation speed than in the seventh forward speed FD7.

[Engine and Parallel Mode Ninth Forward Speed]

In the engine and parallel mode ninth forward speed FD9, the second input shaft IS2 and the fourth drive gear IDG4 are synchronously connected by the sleeve SLE2 of the second synchronizer SN2, and the engine clutch ECL and the second and third clutches CL2 and CL3 are operated.

As such, partial torque of the engine ENG is input to the first sun gear S1 reversed in rotation direction through the motor shaft MDS, the second input shaft IS2, the fourth gear set GL4, the idle shaft IDS and the second gear set GL2.

And partial torque of the engine ENG is input to the first planet carrier PC1 and the first planetary gear set PG1 outputs shifted output torque increased in the rotation speed than in the eighth forward speed through the first ring gear R1, and the output torque is transferred to the differential DIFF through the third gear set GL3 and the output shaft OS, realizing the ninth forward speed FD9.

That is, in the ninth forward speed, since the first sun gear S1 reversely rotates and the first planet carrier PC1 receives torque, the shifted output torque increased in the rotation speed than in the eighth forward speed FD8.

In the above description of the "engine and parallel mode", only the engine ENG is exampled as a power source. However, it may be obviously understood that such shifting operation may be maintained even if the motor/generator MG is activated to form a parallel mode and assist the engine ENG.

An electric vehicle mode EV mode differs from the engine and parallel mode, only in that the engine ENG is stopped while releasing the engine clutch ECL and only the motor/generator MG is used as sole power source. It may be understood that such a difference will not affect the above-described shifting operation, and thus, in such an electric vehicle mode EV mode the same shifting stages of nine forward speeds of the first forward speed FD1 to the ninth forward speed FD9 may be obtained by the same operational chart.

A power transmission apparatus configured for a vehicle according to various exemplary embodiments in FIG. 3 further employs two synchronizers SN1 and SN2, one planetary gear set PG2 and one idle shaft IDS to the various exemplary embodiments of the present invention in FIG. 1, and enables driving in an engine driving mode, a parallel hybrid mode, and an electric vehicle mode, further improving fuel consumption.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus for a vehicle, the power transmission apparatus comprising:
    a motor/generator including a motor shaft selectively connectable to an engine output shaft of an engine;
    a first input shaft selectively connectable to the motor shaft;
    a second input shaft formed as a hollow shaft, coaxially and rotatably mounted on a first portion of the first input shaft without rotational interference between the first input shaft and the second input shaft, and selectively connectable to the motor shaft;
    a third input shaft formed as a hollow shaft, coaxially and rotatably mounted on the second input shaft without rotational interference between the second input shaft and the third input shaft, and selectively connectable to the motor shaft;
    a first torque mediating shaft formed as a hollow shaft and coaxially and rotatably mounted on a second portion of the first input shaft without rotational interference between the first input shaft and the first torque mediating shaft;
    an intermediate shaft mounted in parallel with the first input shaft;
    a first shifting section receiving a torque through the first input shaft, shifting the received torque through a plurality of gear sets, and outputting the shifted torque; and
    a second shifting section including a first planetary gear set including a first sun gear fixedly connected to the first torque mediating shaft, selectively receiving the torques from the first shifting section and the third input shaft, respectively, and outputting shifted torque through a gear set among the plurality of gear sets.

2. The power transmission apparatus of claim 1,
    wherein the first torque mediating shaft is fixedly connected to the second input shaft, and
    wherein the first shifting section includes:
        a first gear set among the plurality of gear sets and having a first drive gear fixedly connected to the first input shaft, and a first driven gear fixedly connected to the intermediate shaft and gear-meshed with the first drive gear; and
        a second gear set among the plurality of gear sets and having a second drive gear fixedly connected to the first torque mediating shaft and a second driven gear fixedly connected to the intermediate shaft and gear-meshed with the second drive gear.

3. The power transmission apparatus of claim 2,
    wherein a gear ratio of the first gear set is used for a first forward speed and a fifth forward speed; and
    wherein a gear ratio of the second gear set is used for a second forward speed.

4. The power transmission apparatus of claim 2, wherein the first planetary gear set further includes:
    a first planet carrier fixedly connected to the third input shaft; and
    a first ring gear gear-meshed with an output shaft through a third gear set among the plurality of gear sets.

5. The power transmission apparatus of claim 4, wherein the first planetary gear set is a single pinion planetary gear set.

6. The power transmission apparatus of claim 4, wherein the third gear set includes:
    a third drive gear fixedly connected to an external circumference of the first ring gear; and
    a third driven gear fixedly connected to the output shaft and gear-meshed with the third drive gear.

7. The power transmission apparatus of claim 6, wherein a gear ratio of the third gear set is used for a fourth forward speed.

8. The power transmission apparatus of claim 4, further including:
    five clutches each selectively connecting a corresponding pair among the first to third shafts, the first torque mediating shaft, the intermediate shaft and the output shaft; and
    a brake selectively connecting a shaft among the first to third shafts, the first torque mediating shaft, the intermediate shaft and the output shaft to a transmission housing.

9. The power transmission apparatus of claim 8,
    wherein the five clutches comprise:
        an engine clutch mounted between the engine output shaft and the motor shaft;
        a first clutch mounted between the motor shaft and the first input shaft;
        a second clutch mounted between the motor shaft and the second input shaft;
        a third clutch mounted between the motor shaft and the third input shaft; and
        a fourth clutch mounted between the intermediate shaft and the output shaft, and
    wherein the brake is mounted between the intermediate shaft and the transmission housing.

10. The power transmission apparatus of claim 1,
    wherein the first torque mediating shaft is coaxially and rotatably mounted on the second input shaft without rotational interference between the first torque mediating shaft and the second input shaft, and
    wherein the first shifting section further includes:
        a second torque mediating shaft formed as a hollow shaft and coaxially and rotatably mounted on the intermediate shaft without rotational interference between the second torque mediating shaft and the intermediate shaft;
        an idle shaft parallel with the intermediate shaft;
        a second planetary gear set including a plurality of rotation elements, and two rotation elements among the plurality of rotation elements are connected to the intermediate shaft and the second torque mediating shaft, respectively;
        a first gear set including a first drive gear fixedly connected to the first input shaft, and a first driven gear fixedly connected to the intermediate shaft and gear-meshed with the first drive gear;
        a second gear set including a second drive gear, a second driven gear and an idle output gear, wherein the second drive gear is fixedly connected to the first torque mediating shaft, wherein the second driven gear is fixedly connected to another rotation element among the plurality of rotation elements of the second planetary gear and gear-meshed with the second drive gear, and wherein the idle output gear is fixedly connected to the idle shaft and gear-meshed with the second driven gear;
a fourth gear set among the plurality of gear sets and including a fourth drive gear externally mounted with the second input shaft without rotational interference between the fourth drive gear and the second input shaft and a fourth driven gear fixedly connected to the idle shaft and gear-meshed with the fourth drive gear;
a first synchronizer configured for selectively connecting the first driven gear with the second torque mediating shaft or selectively connecting the second torque mediating shaft with a transmission housing; and
a second synchronizer configured for selectively connecting the second drive gear with the second input shaft or the fourth drive gear with the second input shaft.

11. The power transmission apparatus of claim 10,
wherein the first planetary gear set is a single pinion planetary gear set; and
wherein the second planetary gear set is a double pinion planetary gear set.

12. The power transmission apparatus of claim 10,
wherein the second planetary gear set includes:
a second sun gear among the two rotation elements of the second planetary gear set and fixedly connected to the intermediate shaft;
a second planet carrier among the two rotation elements of the second planetary gear set and fixedly connected to the second torque mediating shaft; and
a second ring gear which is the another rotation element of the second planetary gear set and fixedly connected to the second driven gear of the second gear set, and
wherein the first planetary gear set further includes:
a first planet carrier fixedly connected to the third input shaft; and
a first ring gear gear-meshed with an output shaft through a third gear set.

13. The power transmission apparatus of claim 12, wherein the third gear set includes:
a third drive gear fixedly connected to an external circumference of the first ring gear; and
a third driven gear fixedly connected to the output shaft and gear-meshed with the third drive gear.

14. The power transmission apparatus of claim 10, wherein the idle shaft selectively receives a torque of the second input shaft through the fourth gear set and transmits the received torque to the second driven gear.

15. The power transmission apparatus of claim 12,
wherein a gear ratio of the first gear set is used for a third forward speed and a fifth forward speed;
wherein a gear ratio of the second gear set is used for a second forward speed;
wherein a gear ratio of the third gear set is used for a sixth forward speed; and
wherein a gear ratio of the fourth gear set is used for a ninth forward speed and a reverse speed.

16. The power transmission apparatus of claim 10, further including:
five clutches each selectively connecting a corresponding pair among the first to third shafts, the first torque mediating shaft, the second torque mediating shaft, the intermediate shaft and the output shaft; and
a brake selectively connecting a shaft among the first to third shafts, the first torque mediating shaft, the second torque mediating shaft, the intermediate shaft and the output shaft to the transmission housing.

17. The power transmission apparatus of claim 16,
wherein the five clutches comprise:
an engine clutch mounted between the engine output shaft and the motor shaft;
a first clutch mounted between the motor shaft and the first input shaft;
a second clutch mounted between the motor shaft and the second input shaft;
a third clutch mounted between the motor shaft and the third input shaft; and
a fourth clutch mounted between the second driven gear and the output shaft; and
wherein the brake is mounted between the intermediate shaft and the transmission housing.

* * * * *